Jan. 31, 1967 L. M. HARVEY ETAL 3,301,434
CAN OPENER
Original Filed Dec. 11, 1964 4 Sheets-Sheet 1
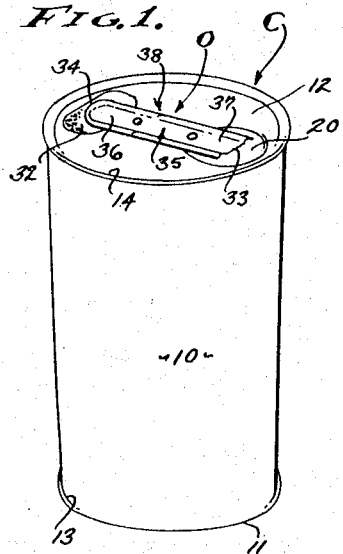
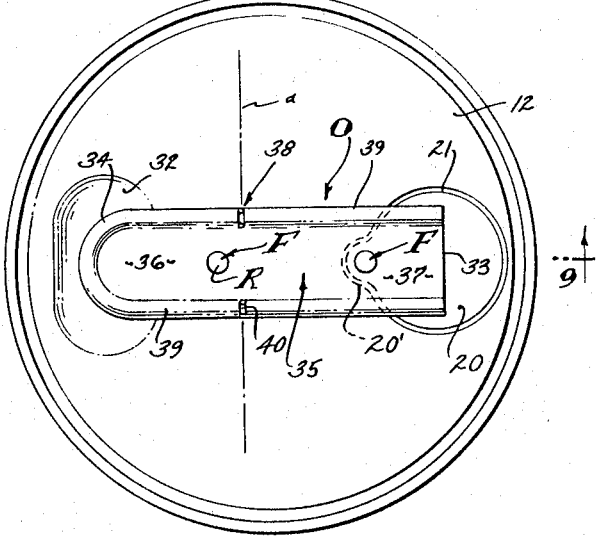
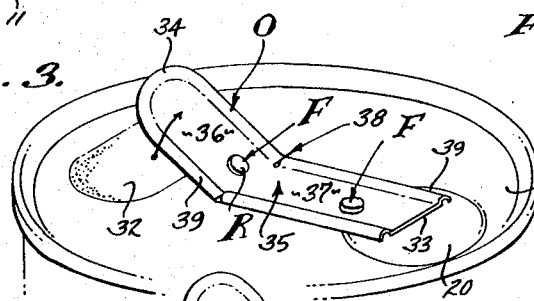
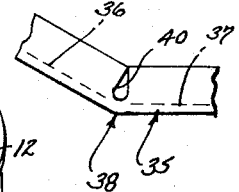
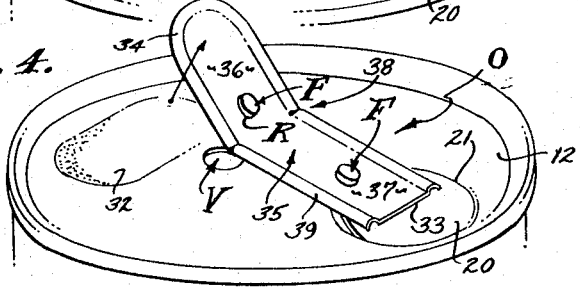
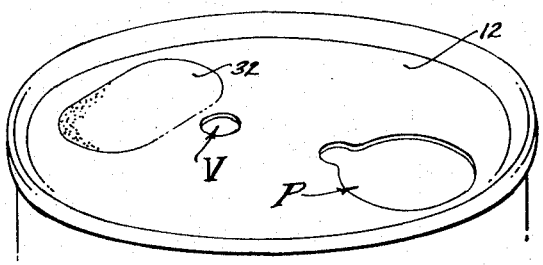
LEO M. HARVEY
RALPH W. HILTON
INVENTORS.
BY

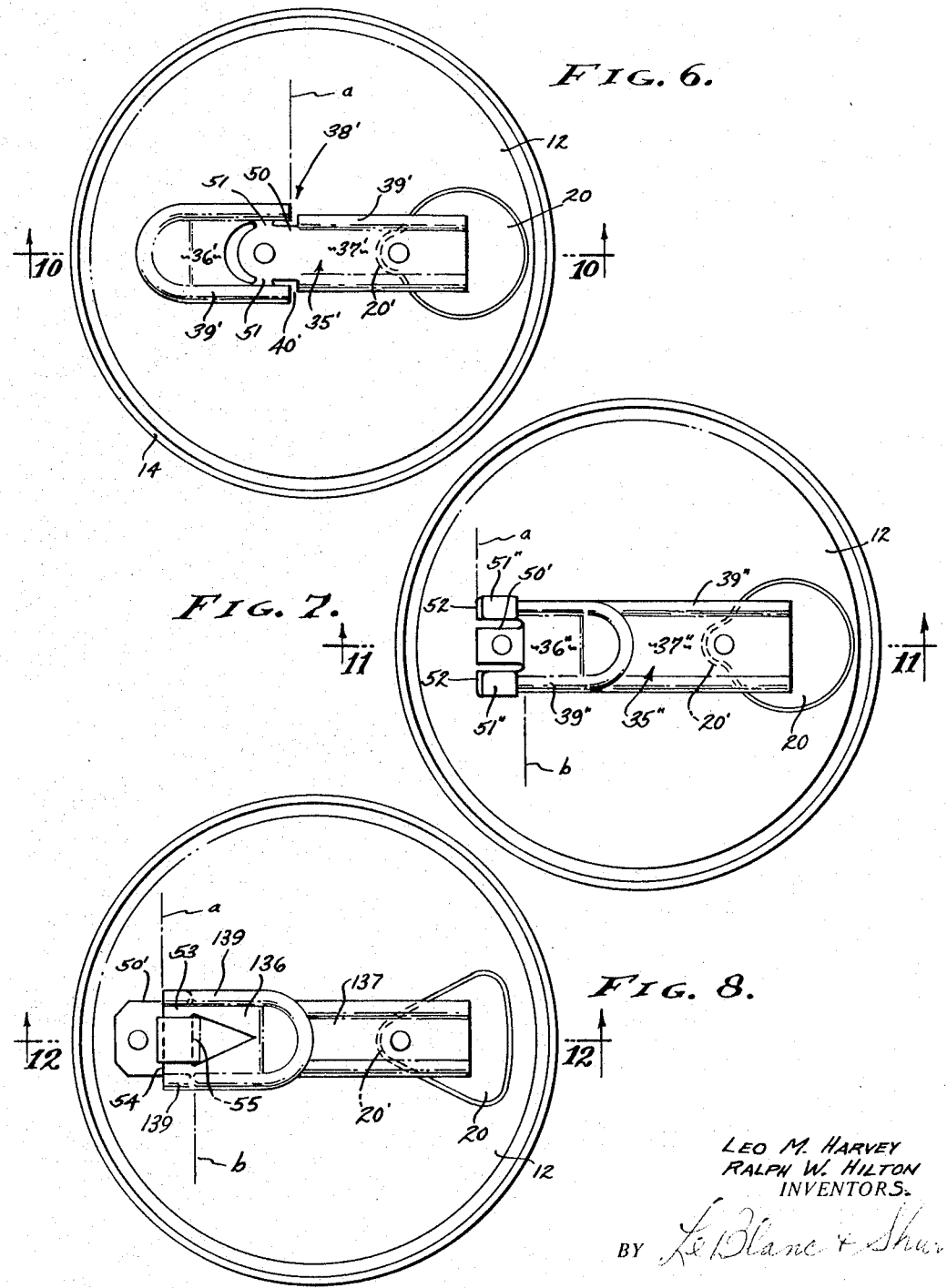

Jan. 31, 1967     L. M. HARVEY ETAL     3,301,434
CAN OPENER
Original Filed Dec. 11, 1964     4 Sheets-Sheet 3
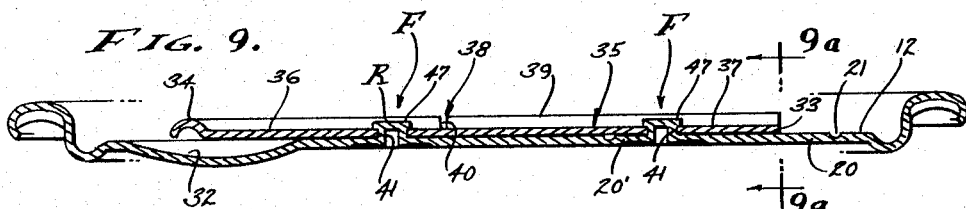
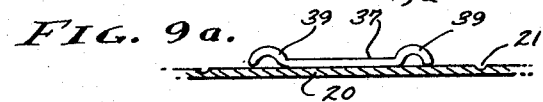
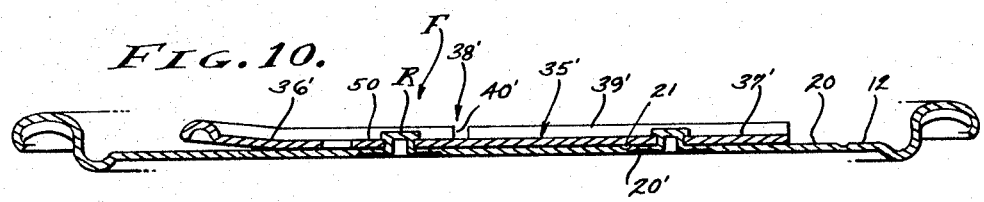
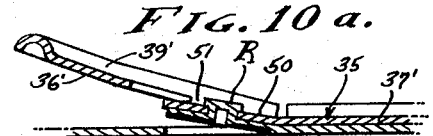
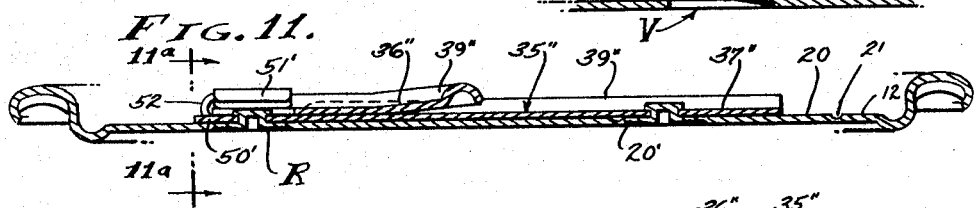
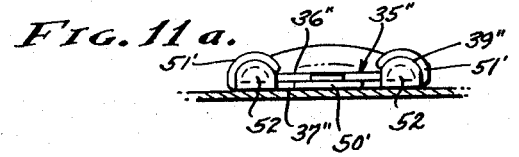
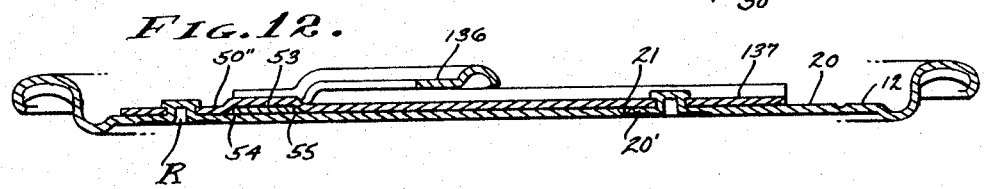
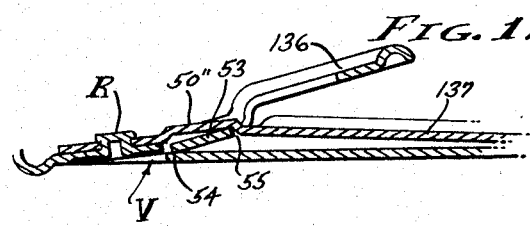
LEO M. HARVEY
RALPH W. HILTON
INVENTORS.

LEO M. HARVEY
RALPH W. HILTON
INVENTORS.

United States Patent Office 3,301,434
Patented Jan. 31, 1967

3,301,434
CAN OPENER
Leo M. Harvey, Los Angeles, and Ralph W. Hilton, Palos Verdes Estates, Calif., assignors to Harvey Aluminum (Incorporated), Torrance, Calif., a corporation of California
Original application Dec. 11, 1964, Ser. No. 417,567, now Patent No. 3,221,924. Divided and this application July 8, 1965, Ser. No. 478,517
8 Claims. (Cl. 220—54)

This application is a division of copending application Serial No. 417,567, filed December 11, 1964, now Patent No. 3,221,924.

This invention relates to containers commonly referred to as "cans" and is particularly concerned with those which utilize prescored areas designed to form pouring and/or vent openings when said areas are removed. Specifically, this invention is concerned with self-opening cans wherein the "can opener" is integrally incorporated in the wall of the can, it being a general object to provide a manually operable means for opening such a can with extreme facility together with safety.

Ordinary self-opening cans of the type under consideration are a hazard and are the subject of complaint from those persons who have broken their fingernails, or who have experienced difficulty in initiating the opening operation, and who have cut themselves in one way or another with opening such cans. Reference is made to prescored self-opening cans wherein a rigid lever is lifted, usually twisted, in order to tear a prescored area from the top of the can. Generally, it is necessary for a person to wedge his fingernail beneath a tab and then to lift the same with the exertion of considerable force, to the end that it is not uncommon for a person to experience difficulty, especially with cans containing pressurized contents which require substantially heavy and/or stiff container walls. A further problem for consideration is sharpness of any and all parts and edges involved, and with the shape of said parts and edges, all of which effects safety.

In addition to the foregoing generalities the prior art can opening devices of this type require pulling action on the part of the person operating the same, and this results in tearing and/or ripping of the prescored area from the can. In other words, the usual tab might aid in initiating the removal of the prescored area but after said initiation the usual tab affords no mechanical assistance except in providing a grip. In order to accomplish tearing action, the usual tab is diagonally related to the strip of metal that is to be removed and it is this relationship that affords twisting action which is necessary when pulling out the prescored area by means of brute force. The said pulling action can be dangerous since it is not uncommon for the prescored area to be larger than the tab, and since there is a tendency for a person's fingers to slip from the tab, and because a better grip is often gained by a person encroaching his fingers onto the already torn portions of the area being removed. Obviously, any slippage of the fingers on the torn portions is likely to result in cuts from the sharp edges.

An object of this invention is to provide a can opener that is particularly adapted to the merchandizing of beverages and wherein mechanical advantage is realized throughout the opening operations and thereby eliminating the necessity of applying primitive pulling force in the removal of the predetermined areas.

An object of this invention is to provide a self-opening can with predetermined areas that are sequentially removable in order to establish one a pouring opening and one a vent opening.

Another object of this invention is to provide prelocated and removable vent and pouring openings in a can of the type under consideration that are shaped so as to be removed with the application of substantially uniform pressures and so as to eliminate sharp corners.

It is an object of this invention to provide a can opener in the form of a single element or part and which is operable to separately and sequentially remove predetermined areas from the can, and in each instance with mechanical advantage.

It is another object of this invention to provide a can opener of the charcter thus far described and which advantageously employs one element for dual purposes, in that said element is first employed to remove one riveted area followed by its second employment in the removal of a prescored area. The removal of the two predetermined areas are independent of each other although the removal of the second area necessarily follows the removal of the first area. As is the case illustrated herein, it is most practical to first remove the smaller riveted vent area followed by removal of the larger prescored pouring area.

It is still another object of this invention to provide a can opener of the character referred to wherein a single element is employed and wherein said single element is employed and wherein said single element is advantageously provided with sections having limited movement relative to each other. In carrying out this invention the said single element utilizes the principles of levers, there being one section of the element effective to remove one riveted area (the vent area) and there being another section useable with the first mentioned section effective to remove the prescored area (the pouring area). The said first mentioned one section stops relative to the said second mentioned other section, whereby the total of the two sections is effective to establish a single lever, the first mentioned one section affording the one and only necessary grip.

It is still another object of this invention to provide a can opener wherein there are two sections, each operable to open a predetermined area respectively, and wherein the two sections are linked together in such a manner that they normally lie flat against each other and against the wall of the can, that they function independently to sequentially remove the said predetermined areas from the can, that they are linked in such a manner that the first operated section overlies the other and is engageable as a grip and affords the grip or handle that operates the second underlying section, and that remains connected and intact with the removed areas.

The various objects and features of this invention will be fully understood from the following detailed description of the typical preferred forms and applications thereof, throughout which description reference is made to the accompanying drawings, in which:

FIG. 1 is a perspective view of a typical can with the opener, in its first and preferred form, incorporated thereon. FIG. 2 is an enlarged plan view of the can and its opener as shown in FIG. 1.

FIGS. 3, 4 and 5 are enlarged perspective views showing the sequential operations of the opener shown in FIG. 1, and FIG. 3a is an enlarged fragmentary view of the opener parts as they occur in FIGS. 3 and 4.

FIGS. 6, 7 and 8 are views similar to FIG. 2, showing second, third and fourth forms of the opener.

FIGS. 9, 10, 11 and 12 are enlarged detailed sectional views taken as indicated by lines 9—9 on FIG. 2, 10—10 on FIG. 6, 11—11 on FIG. 7, and 12—12 on FIG. 8.

FIGS. 9a, 10a, 11a and 12a are detailed sections related to FIGS. 9, 10, 11 and 12, respectively.

Figure 13:
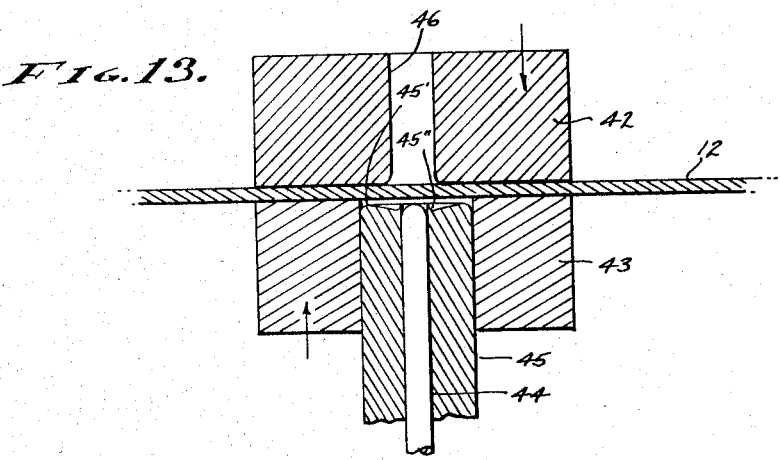
Figure 14:
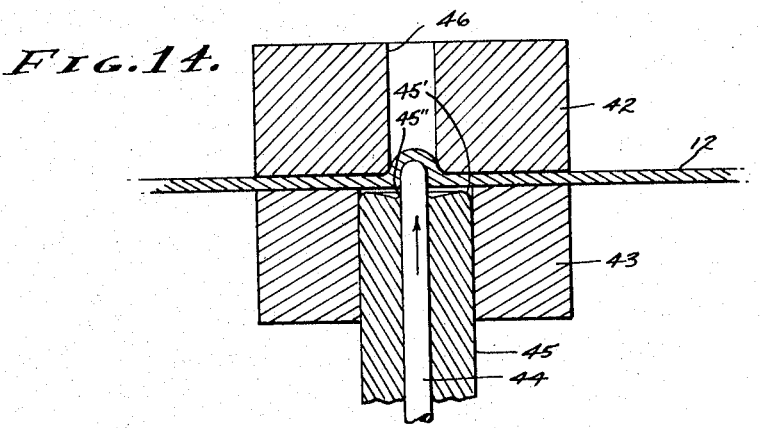
Figure 15:
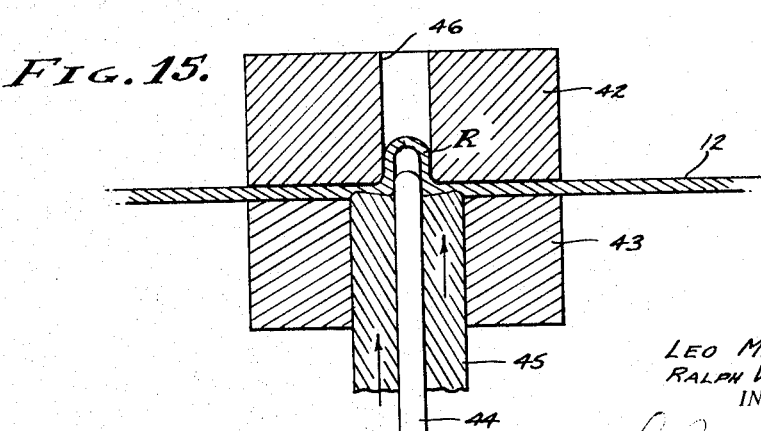

FIGS. 13, 14 and 15 are diagrammatic sections illustrating the process utilized in the formation of the fastener employed in securing the opener to the can.

Cans of the type under consideration are intended to hold liquid or malt beverages and are made of material thick enough and stiff enough to withstand any normal internal gas pressures that may be caused by sterilization or by heating or by shaking of the cans. Because of the design of existing can handling equipment, it is necessary to avoid projections on the cans, although it is permissible to have flat parts superimposed over certain areas of the cans. For example, a flat part can lie adjacent the top or bottom of the can, recessed within the confines of the can rim or head.

Self-opening cans of the prior art utilize the recessed top in which to carry an opening lever that is manipulated to tear or break out a prescored pouring and vent area. Again, and with the present invention, it is this recessed top which is preferred to be employed for locating the opener hereinafter described. However, this preferred location is not to be implied as a limitation, since the novel means disclosed herein can be advantageously applied to the various surfaces of a can.

The invention is applicable generally to a container C which is of the type commonly referred to as a can. A typical can is illustrated wherein there is a cylindrical body 10 closed by disc-shaped bottom and top closures 11 and 12. The bottom 11 is attached to the body 10 at a chine 13 while the top 12 is joined to the body by a double seam 14. In practice, the top 12 is applied and the seam 14 formed after the can is filled, and it is usual that the top 12 is recessed within the seam 14 so formed. Essentially the can C is a shell of relatively thin material, preferably metallic.

In accordance with the invention we provide a pair of openings P and V which are sequentially established at predetermined areas respectively. In FIGS. 1 to 6, 9 and 9a, we have illustrated the first and preferred form wherein there is a pouring opening P of generous capacity and a vent opening V of restricted capacity, the invention being characterized by the shape and size of said openings P and V and by the single opener O which is related to the two said predetermined areas to open them consecutively and independently. The openings P and V, are established in or at the top 12 and are spaced apart, preferably diametrically across the center of the can top. The said predetermined areas vary in shape in order to best serve the purpose for which they are intended, and although it is advantageous to provide a rather large pouring area 20 or opening P it is also advantageous to provide a substantially small prescored area 20' for the initiation of the shearing action necessary for its removal. Also, as above stated, it is advantageous to have a rather small vent opening V. Therefore, one of the features of this invention is the provision of a unique and small diameter fastener F that secures the opener O to the two prescored areas individually. As shown, the pouring opening P or area 20 is essentially a rounded opening or area and in cans of 2 and ¾-inch diameter is an opening or area of ¾-inch diameter. Thus, the pouring opening P or area 20 features the peripheral enlargement 20' that is described to a rather small diameter, a diameter to receive the fastener F. It is preferred that the enlargement 20' and rivet area be of like or identical diameter, for instance .150-inch diameter. In practice, the top 12 is approximately .015-inch thickness in which case it has been found to be practical to form a fastener F with an outside diameter of .093 inch, and which has a head diameter of .10 inch. Thus, the prescored area 20' is but slightly larger than the fastener F and is defined by a line of scoring 21 applied as by indenting the top 12 to a substantial depth so as to weaken the material of the top. It will be apparent that the depression of line 21 is entirely on radius lines or curves with an absence of sharp corners.

The opener O as shown in FIGS. 1–6, 9 and 9a comprises a sectional body 35 with a section or lever 36 secured to the can top 12 by a fastener F and with a section or lever 37 secured to the prescored area 20–20' by a fastener F. In accordance with the invention the body 35 is reinforced so as to be rigid and so that the sections 36 and 37 are operable as levers. However, the two sections 36 and 37 are coupled by hinge means 38 in order that the levers are independently operable as best illustrated in FIG. 9. The single body 35 is flat and elongate, and it is secured in flat engagement on the top 12 and recessed below the rim or seam 14 of the can. The body 35 is preferably a metal part, for example of aluminum, approximately two inches in length and ½-inch width, made of sheet of about .020 inch thickness. It is significant that the body 35 is a one piece construction that is formed in a straight, flat and elongate configuration. In order for the body 35 to be operable for the several functions of the opener O, the body is made of a bendable material and in practice can be advantageously made of relatively soft aluminum. Therefore, in order for the sections 36 and 37 to operate as levers the body 35 is reinforced as by ribs 39 raised along each opposite side margin of the body. As shown, the ribs 39 are round beads that are straight and which are effective in establishing beams coextensive with each side of the body 35.

Body section or lever 36 is the manually engaged part of the opener O and is a gently rounded part that is adapted to be conveniently gripped beneath the fingers. The body section to be gripped and used as a lever must be substantially rigid and in addition to the marginal ribs, above described, it has a transverse continuation of said ribs that extends across the active end 34, said end 34 being formed on a radius merging tangentially with the ribs 39. Thus, the arcuate continuation of ribs 39 through the end 34 reinforces the body 35 so as to establish a rigid lever 36.

Body section or lever 37 is coupled to the above described body section or lever 36 and is adapted to be operated through the manual movement of the lever 36. The body section or lever 37 is a straight and rigid part terminating in a straight transverse butt end 33. The ribs 39 continuous with the body 35 reinforce this section or lever 37 thereof, and so that it is a rigid lever.

The opener O is characterized by the two levers 36 and 37 which are independently operable in their respective functions of opening the riveted areas of the can and to this end the hinge means 38 is provided in order to connect the levers 36 and 37 movably relative to each other. The hinge means 38 can vary and in the first and preferred form employs to advantage the bendable property of the metal from which the opener is made, for example aluminum, and involves weakening of the ribs 39. The said weakening can be accomplished in various ways and can be any depression, crease or interruption effective to disrupt the continuity of the ribs 39. In the form under consideration the weakening comprises an interruption in the crown of each rib there being a slit 40 disposed along a transverse line a extending across the body 35. In accordance with the invention the slit 40 involves the removal of material from the crowned portion of the rib, without removal of material from the flat portion of the body 35 extending between the ribs, and further the slit 40 is made of predetermined dimension in order to control the hinged movement between the two levers 36 and 37. Therefore, the invention advantageously employs the slit 40 to establish the hinge lines a and to limit the hinged movement of lever 36 relative to lever 37, limiting said movement as shown in FIG. 3a when the side walls of said slit close together.

The body sections or levers 36 and 37 are each secured to the top of the can and in each instance by the fastener F of minimized diameter. In accordance with the invention the fastener F is adapted to be sheared from the top 12, the fastener F being a rivet type of fastener extruded from the surrounding material of the can top 12. The fastener F is also efficient in its securement capabilities, and a small diameter hole 41 is provided (two places) in the body 35, one for removal and establishment of vent oepning V and one for removal of the prescored area 20–20′; the fastener F comprising an upstanding stud-shaped projection that is extruded from the thickness of the material forming the top 12. The top 12 is confined (FIG. 13) between the flat faces of a pair of opposed pressure plates 42 and 43, to prevent lateral flow of material from the rivet area, during which a mandrel 44 and an extrusion punch 45 work the rivet area of top 12 from the underside and extrude therefrom a closed top tubular rivet R into a sized opening 46 in the upper pressure plate 42. The sized opening 46 in the upper pressure plate is to the size of the external diameter of the rivet R, while the said mandrel 44 is to the size of the internal diameter of the rivet R. The said mandrel 44 is moved (FIG. 14) to occur at the said sized opening in the upper pressure plate, thereby establishing an extrusion orifice and whereupon the said extrusion punch 45 moves (FIG. 15) into pressured engagement with the underside of the top 12 immediately surrounding the mandrel 44 and sized opening 46. The outside diameter of punch 45 establishes the radial extent of the rivet area, the top engaging face of the punch 45 being characterized by a dished or concaved configuration wherein the peripheral portion 45′ is axially forward of the apertured portion 45″. As shown, the portions 45′ and 45″ are well rounded convexly and concavely respectively, into order to form a dimple at the underside of the top 12. As a result, material is displaced by the extrusion punch 45 and a small diameter and cylindrical rivet R is projected by means of extrusion from the top 12 to be received in the hole 41. Thus, the dimple is pressed into the top 12, beneath the extrusion to be formed, with a concavely reduced peripheral portion and with a convexly reduced opening to the interior diameter of the rivet that is worked from the sheet material, said dimple establishing an area of weakening at and/or immediately surrounding the diameter of the rivet per se. It is then a simple matter to head the rivet according to usual procedure applying force axially to flatten the head 47 as shown.

With the opener O fastened flat against the top 12 as shown in FIGS. 1, 2 and 9, means is provided in the form of a recess 32 depressed into the top 12 and underlying the active end 34 of the lever 36 since the opener O extends across the can the recess 32 will occur at one side of the top 12 with the prelocated vent rivet R occuring toward the center of the can top. For example, the vent rivet R is located at or near the center of top 12 with the hinge line a displaced at or away from the side of the rivet R opposite the active end 34 of the lever 36. The hinge line a can be coincidental with the center of the rivet R, or it can be away from the side of the rivet as shown and in which case a second class lever 36 is established with the resistance at vent rivet R between the active power application end 34 and fulcrum at hinge line a. As best illustrated in FIG. 3 (also FIG. 10) the hinge line a can bear against the top 12 immediate to the rivet R, so that lifting force applied to end 34 causes the lever 36 to simultaneously lift, tip and pry the rivet R from the surrounding top 12. However, in some instances the mode of application and/or flexibility in the top 12 permits tipping and prying of the rivet R without the lever fulcrum necessarily touching the top 12. In the event that flexibility permits bulging or crowning of the area immediately surrounding the dimpled area of the rivet prior to the commencement of tipping or revolvement of the rivet area, then the rivet area is simply revolved by the lever action, and which ultimately results in shearing at or along the side thereof nearest the active end 34 of the lever, after which shearing action rapidly progresses completely around the rivet R while prying is continued. As a result, there are two theories of operation; one wherein the fulcrum engages top 12 in which case the lever 36 relies upon the hinge line a for its fulcrum; and one wherein the fulcrum does not necessarily touch the top 12 in which case the lever 36 directly revolves the rivet area immediately surrounding the rivet R. By placing the hinge line a just beyond the periphery of the dimple as indicated, complete removal of the top 12 at and immediately surrounding the rivet R is assured under either of the two specified theories of operation.

The prescored area 20 is placed at or near the side of the can in a straight line diametrically opposite the active end 34 of the opener O, and with the area enlargement 20′ located in said straight line and toward the said active end of the lever 36. Having operated the lever 36 as above described, the rivet R is displaced from the top 12 entirely by shearing action with the mechanical advantages afforded by the lever 36, and the lever 36 is moved until it is stopped by the limit of the hinge member 38 whereupon the lever 36 becomes inactive as such and is converted into a body section 36 or extension of lever 37. Continued lifting force applied to the body section 36, which now becomes a handle or grip, simultaneously tips and pries the prescored area 20–20′ from the surrounding top 12. Again, flexibility in the top 12 permits considerable tipping of the prescored area 20–20′ prior to the commencement of shearing along the side of area 20′ nearest the active end 34 of the lever extension or section 36, after which shearing action along the line of scoring 21 rapidly progresses at least midway around the prescored area 20. A feature of the present invention is the termination of butt end 33 within the confines of the prescored area 20, about midway thereof and to the end that the lever 37 is a second class lever with resistance at fastener F between the power at end 34 and fulcrum at but end 33. As best illustrated in FIG. 4, the butt end 33 bears against the mid-portion of prescored area 20 within the confines of scoring 21 and so that lifting force applied to the end 34 causes simultaneous tipping and prying of the prescored area 20–20′. As a consequence, the smaller and slightly enlarged area 20′ is first to shear upwardly, and with ease due to the considerable length of the extended lever 37.

In accordance with the invention the entire lever 37 (with section 36) forms a substantial sized lever for the continuation of shearing and final pulling away of the prescored area 20–20′. The shape of prescored area 20 is instrumental in facilitating its removal by shearing action, said area being round and being joined to a lever 37 of substantial length. As a result, a well-rounded pouring opening P is established at one side of the can C and a minimum sized vent opening V is established at the center or to the opposite side of the can C.

A second form of opener is shown in FIGS. 6, 10 and 10a and wherein the body 35′ involves a modified hinge means 38′. In this form the two body sections or levers 36′ and 37′ are independent in their functions, one to shear out the vent rivet R and one to shear out the prescored area 20–20′. In this form the slot 40′ does not necessarily limit the movement of lever 36′ relative to lever 37′ and simply establishes the hinge line a by permitting the body 35′ to bend. However, the hinge means 38′ includes features facilitating shearing out of the vent rivet R, and it involves removal of the body 35′ between the side ribs 39′ and the retention of a tongue 50 therebetween to lift the vent rivet R. The said vent rivet R is fastened to tongue as above described, said tongue projecting integrally from the lever 37′ and having laterally projecting ears 51 integrally joined to the ribs 39′ at opposite sides of the rivet. As shown, the tongue 50 determines the width of lever 37′ which is narrower than the lever 36′. When lifting force is applied to the lever 36′ the second class lever action is as above described while the ears 51 are easily twisted and thereby permit a substantially direct upward pull to shear the vent rivet R from its position in the top 12.

A third form of opener is shown in FIGS. 7, 11 and 11a and wherein the body 35" involves another modified hinge means 38". In this form the two body sections or levers 36" and 37" are independently operable, one to shear out the vent rivet R and one to shear out the pre-scored area 20–20'. In this form the levers 36" and 37" are folded one over the other at the hinge line a, the rib portions 39" continuing through a bend 52 at each side of the body 35", and with the removal of the body between the side ribs and with the provision of a tongue 50' the same as tongue 50 above described. A feature of this form is the location of hinge line a at the bends 52 and the provision of a second hinge line b. The two hinge lines a and b occur at opposite sides of the vent rivet R so that lifting of the lever 36" results in a tipping and prying action much the same as in the first form. Bending on the line b is accomplished by locking the ribs 39" of lever 36" to flexible and bendable margins continuing from the ribs of lever 37" (see dotted lines in FIGS. 11 and 11a). Ears 51" project laterally from said marginal continuations of lever 37" and lock over the ribs 39" of lever 36" (see FIG. 11a). The direction of tipping is reversed, compared with the first two forms described, and the bent up lever 36" forms a handle and not an extension. However, this form provides for the wide separation of the predetermined areas 20 and 30.

A fourth form of opener is shown in FIGS. 8, 12 and 12a and wherein there are two separate bodies or levers 136 and 137, each independently movable as a lever to lift out the vent rivet R and the prescored area 20–20' respectively. In the form of invention now under consideration the predetermined areas can be most widely separated, the lever 136 being swivelly coupled to the lever 137, and one to overlie the other substantially the same as described in the preceeding form. Again, a tongue 50" projects from the lever 137 and in this instance has an intermediate portion joggled so as to be spaced from and parallel to the top 12 of the can. Further, in this instance the lever 136 is stirrup-shaped and comprises a rigid bar 53 that extends between the ribs 139 and beneath the joggled portion of the tongue, the bar 53 having two parallel and transverse edges 54 and 55. The edge 54 forms the fulcrum at line a while the edge 55 forms the lift beneath bend line b that occurs in lever 137. From the foregoing it will be apparent how the normally flat and superimposed levers 136 and 137 are operated, each as a second class lever, first to operate the lever 136 to shear out the vent rivet R and second to operate the lever 137 to shear out the prescored area 20–20'. As shown, in this last form, the area 20–20' is essentially triangular, having a curved side at the rim or bead of the top 12 and two straight sides extending to the usual area 20'. The joinders of the sides of this last described prescored area are well rounded, as shown.

Operation of any one of the forms of can opener hereinabove described is a simple matter, in each case accompanied by mechanical assistance throughout the operation and with safety. It is significant that in each instance the single unit of structure is incorporated in the wall of the can, and is operable at one time and in sequence to open spaced areas in the can. It is normal for these openings to be in the can top 12, one a rather large pouring opening P and one a rather small vent opening V. Pulling and tearing action is avoided by the provision of sequentially operable levers and the amount of force necessary to affect shearing of said predetermined areas is materially reduced by the provision of the unique and small diameter fasteners F in the form of extruded rivets R. In the first form the lever 36 has stopped engagement with respect to the lever 37 and thereby establishes an extension that lengthens the lever 37; and this limited movement at the hinge 38 also prevents overbending of the body 35 thereby preventing fatigue in the metal forming the same. In each form the prescored area commences to shear at a portion of reduced size, and the enlarged prescored area 20 is round (or rounded) with the absence of sharp corners. Finally, in each form the lever used in removal of the vent rivet R is effective throughout the removal action, and the lever used in removal of the pouring-prescored area is substantially elongated, and in the first form is extended, and is thereby especially effective by virtue of its length and size as an instrument to cause final shearing and removal of the said prescored area.

Having described only typical preferred forms and applications of our invention, we do not wish to be limited or restricted to the specific details herein set forth, but wish to reserve to ourselves any modifications or variations that may appear to those skilled in the art and fall within the scope of the following claims.

Having described our invention, we claim:

1. A can and opener for establishing spaced pouring and vent openings therein, and including:
    (a) a can having an imperforate wall with spaced predetermined pouring and vent areas thereon, the pouring area being defined by a continuous prescored line;
    (b) and an opener overlying the wall and comprising an elongate body of bendable material with two lever sections coupled at a hinge line, one lever section being fastened to the pouring area and with a tongue fastened to the vent area, said body having a pair of longitudinally disposed stiffening ribs at opposite sides thereof and said ribs being interrupted at the hinge line, and the tongue of the one lever section projecting between the ribs of the other lever section and with a pair of ears joining it to said spaced ribs, whereby the said other lever is operable to lift the tongue to sequentially remove from the can top the vent and pouring areas.

2. A can and opener for establishing spaced pouring and vent openings therein, and including:
    (a) a can having an imperforate wall with spaced predetermined pouring and vent areas thereon, the pouring area being defined by a continuous prescored line;
    (b) and an opener overlying the wall and comprising a single elongate body of bendable material with two lever sections and one superimposed over the other and coupled together between an end fulcrum and a bend line spaced from the fulcrum, the lower lever section fastened to the prescored area and with a tongue bendable at said bend line and projecting to the fulcrum and fastened to the vent area, said lower lever section having a pair of stiffening ribs at opposite sides terminating at said bend line, said upper lever section having a pair of stiffening ribs at opposite sides terminating at said bend line, said upper lever section having a pair of stiffening ribs at opposite sides continuing to the fulcrum, whereby lifting of the upper lever section engages the end fulcrum thereof with the can wall and raises the bend line to tip the tongue carried by the lower lever that is coupled to the said upper lever, shearing the vent area from the can wall, followed by continued lifting causing the lower lever to shear out of the wall the prescored pouring area.

3. A can and opener for establishing spaced pouring and vent openings therein, and including:
    (a) a can having an imperforate wall with spaced predetermined pouring and vent areas thereon, the pouring area being defined by a continuous prescored line;
    (b) and an opener overlying the wall and comprising two separate lever sections and one superimposed over the other, the lower lever section fastened to the prescored area and with a bendable tongue extended to and fastened to the vent area, said upper and lower lever sections being reinforced for stiffness, and there being a bar for revolvement by the upper lever and normally flat beneath a joggle in said tongue, whereby lifting of the upper lever causes the said bar to revolve so that one edge thereof bears on the can wall and the other edge thereof raises the tongue and thereby tips the tongue to pry the vent area from the can wall, followed by continued lifting causing the lower lever to shear out of the wall the prescored pouring area.

4. A can top and opener therefor, including an imperforate can top with preweakened pouring and vent areas thereon, and an opener overlying said can top and comprising a handle portion having a rounded end with an aperture therein for gripping by the hand of a user, said opener including a tongue of bendable material spaced from said rounded end by said apeature and a stiffening rib along each side and around said rounded end, said tongue being coupled to the rib at each side of said opener by an ear whereby the body of said tongue is spaced from the rib at the sides of said opener, said rib at each side of said opener forming at the end adjacent said tongue a second class lever fulcrum whereby lifting of said handle causes said opener to act as a second class lever and lifting of said handle portion causes said tongue to bend permitting a substantially direct upward pull on said vent area of said can top, and rivet means coupling said tongue to said perweakened pouring and vent areas of said can top.

5. Apparatus according to claim 4 including a can secured to said can top.

6. A can top and opener therefor, including an imperforate can top with preweakened pouring and vent areas thereon, and an opener overlying said can top and comprising an elongate body with two lever sections coupled together by a flexible tongue, one lever section being in the form of a handle having an aperture therein for gripping by the hand of a user, said one lever section having stiffening ribs along its outer edges and said tongue secured to said ribs, said tongue being spaced from one end of said one lever section by said aperture, the other of said lever sections having a central portion integral with said tongue and a pair of longitudinally disposed stiffening ribs at opposite sides thereof, the ribs of said two lever sections being spaced, said other lever section extending from said one lever section to said pouring area of said top, and means coupling said tongue to said preweakened vent and pouring areas of said can top.

7. A can top and opener therefor including an imperforate can top with preweakened pouring and vent areas thereon, and an opener overlying said can top and comprising an elongate body of bendable material with two lever sections coupled at a hinge line, said body having a pair of longitudinally disposed stiffening ribs at opposite sides thereof, said ribs being interrupted at said hinge line, said body having a central tongue common to said two lever sections and fastened to said vent and pouring areas, one of said lever sections being in the form of a handle having an aperture therein for gripping by the hand of a user, said aperture spacing said central tongue from one end of said one lever section, said other lever section extending from said one lever section to said pouring area of said top, the stiffening ribs of said one section being offset laterally from the stiffening ribs of said other section.

8. Apparatus according to claim 7 including a can secured to said can top.

References Cited by the Examiner

UNITED STATES PATENTS

| | | | |
|---|---|---|---|
| 2,048,859 | 7/1936 | Grove | 220—53 |
| 3,151,766 | 10/1964 | Henchert | 220—54 |
| 3,232,474 | 2/1966 | Dunn | 220—48 |

FOREIGN PATENTS 933,533   8/1963   Great Britain.

THERON E. CONDON, *Primary Examiner.*

G. T. HALL, *Assistant Examiner.*